(12) United States Patent
Massone et al.

(10) Patent No.: US 12,494,307 B2
(45) Date of Patent: Dec. 9, 2025

(54) SYSTEM AND METHOD FOR PRODUCING FOAMED SEALING FOR WIRING

(71) Applicant: TE Connectivity Italia Distribution S.r.l., Turin (IT)

(72) Inventors: Marianna Massone, Turin (IT); Marcello Farinola, Turin (IT); Alessandro Genta, Collegno (IT)

(73) Assignee: TE Connectivity Italia Distribution S.R.L., Turin (IT)

( * ) Notice: Subject to any disclaimer, the term of this patent is extended or adjusted under 35 U.S.C. 154(b) by 450 days.

(21) Appl. No.: 17/686,642

(22) Filed: Mar. 4, 2022

(65) Prior Publication Data

US 2022/0285054 A1    Sep. 8, 2022

(30) Foreign Application Priority Data

Mar. 5, 2021    (IT) .......................... 102021000005159

(51) Int. Cl.
*H01B 17/30* (2006.01)
*H01B 19/00* (2006.01)
*H02G 1/06* (2006.01)

(52) U.S. Cl.
CPC ........... *H01B 17/306* (2013.01); *H01B 19/00* (2013.01); *H02G 1/06* (2013.01)

(58) Field of Classification Search
CPC ...... H01B 17/30; H01B 17/306; H01B 19/00; H02G 1/06
USPC ...................................................... 174/50.6
See application file for complete search history.

(56) References Cited

U.S. PATENT DOCUMENTS

| | | | |
|---|---|---|---|
| 5,568,584 A | 10/1996 | Smith | |
| 6,051,792 A | 4/2000 | Damm et al. | |
| 6,152,767 A | 11/2000 | Roosen et al. | |
| 9,543,746 B2 | 1/2017 | Dower et al. | |
| 10,483,730 B2 | 11/2019 | Bednarowski et al. | |
| 10,530,071 B2 | 1/2020 | Schmidt et al. | |
| 2005/0074553 A1 | 4/2005 | Takahashi et al. | |
| 2012/0043103 A1 | 2/2012 | Yin | |

FOREIGN PATENT DOCUMENTS

| | | |
|---|---|---|
| CN | 1088716 A | 6/1994 |
| CN | 1209912 A | 3/1999 |
| CN | 201829633 U | 5/2011 |
| CN | 103299499 A | 9/2013 |
| CN | 108140962 A | 6/2018 |
| CZ | 289286 B6 | 12/2001 |

(Continued)

OTHER PUBLICATIONS

Machine Translation of Schaafsma, CN 1088716A (Jun. 29, 1994) (Year: 1994).*

(Continued)

*Primary Examiner* — Tremesha W Burns
(74) *Attorney, Agent, or Firm* — Barley Snyder

(57) ABSTRACT

A cable exit cover for sealing a portion of a cable includes a first cover member and a second cover member matable with the first cover member to define a housing having an inlet receiving the cable. The inlet has a sealing seat accommodating the cable. The sealing seat has a plurality of gripping devices uniformly distributing a dispensed sealing material along the sealing seat to seal a gap between the sealing seat and the cable.

19 Claims, 7 Drawing Sheets

(56) References Cited

FOREIGN PATENT DOCUMENTS

| DE | 102014222451 A1 | 3/2016 |
|----|---|---|
| EP | 0575520 A1 | 12/1993 |
| EP | 0876697 A1 | 11/1998 |
| EP | 0796722 B1 | 2/2002 |
| KR | 100387308 B | 8/2003 |
| WO | 9216989 A1 | 10/1992 |
| WO | 9409533 A1 | 4/1994 |
| WO | 2014182373 A1 | 11/2014 |

OTHER PUBLICATIONS

Search Report from the INDI (FR) dated Sep. 28, 2022, corresponding to Application No. FR 2201828, 10 pages.
Italian Search Report, App No. IT 2021000005159, dated Oct. 25, 2021, 11 pages.
Japanese Office Action and English translation thereof, dated Apr. 11, 2023, Patent Application No. 2022-031367, 7 pages.
Korean Office Action dated Nov. 28, 2023 with English translation, corresponding to Application No. 10-2022-0028131, 13 pages.
Chinese Office Action dated Apr. 1, 2025 with English translation, corresponding to Application No. 2022101977047, 18 pages.
Chinese Office Action dated Sep. 13, 2025 with English translation, corresponding to Application No. 202210197704.7, 12 pages.

\* cited by examiner

SYSTEM AND METHOD FOR PRODUCING FOAMED SEALING FOR WIRING

CROSS-REFERENCE TO RELATED APPLICATIONS

This application claims the benefit of the filing date under 35 U.S.C. § 119(a)-(d) of Italian Patent Application No. 102021000005159, filed on Mar. 5, 2021.

FIELD OF THE INVENTION

The present invention relates to a seal and, more particularly, to a seal for a wire.

BACKGROUND

Electrical cables are generally sealed against the environment to prevent damage to the cable conductors and to the connectors joining them, for example they are sealed against penetration of water and/or dust into the electrical wires. Gel materials such as silicone gels, polyurethane gels, polyurea gels or thermoplastic gels may be used to seal the electrical cables.

For example, document EP 0 575 520 B1 discloses a gel-filled enclosure for a cable butt splice or an elongate substrate such as a telecommunication cable splice, coaxial cable splice and the like. The cable splice enclosure comprises two symmetrical halves, which are fitted together to form an enclosure around a portion of two coaxial cables and to connect them together. The cable splice is contained within the central portion of the enclosure and surrounded by a suitable gel material, such as silicones, thermoplastic materials, polyurethanes, polyureas, and polyisobutylenes.

Standard techniques of dispensing the gel materials on the inner surface of predefined grooves on the two cable covers do not assure a uniform distribution of the dispensed materials. In fact, the dispensed material is typically injected into the predefined grooves of the two cable covers by using a robotic application that is configured to move on a plane, parallel to the plane where each of the two cable covers is laying. During injection, the dispensed material tends to flow towards the bottom of the groove because of gravity and tends to accumulate there, thus leaving the portion of the groove proximate to the splitting line of the cable cover with a reduced amount of dispensed material. In this way, when the cover is formed by combining the two mating halves, the portion of the cable close to the splitting line of the cover is not adequately protected and sealed against the environment, because the radial thickness of the dispensed material thereon is lower with respect to the radial thickness of the dispensed material at the bottom of the groove. It might even occur that gaps in the sealing material are formed in correspondence of the splitting line of the cable cover.

An alternative method for forming a protective layer on a cable consists in constantly rotating the cable during dispensation of the protective material. For instance, document US 2005/0074553 A1 describes a method for impregnating and curing an electric coil with a layer of polyurethane. The method includes a preliminary heating step, wherein an article having a coil is heated to a preliminary heating temperature at which the viscosity of a polyurethane varnish decreases and is above a drying temperature. The method also includes a varnish application step, wherein the polyurethane varnish is continuously applied to the coil while rotating the heated article at a constant speed. The method further includes a high-temperature rotary drying step in which the polyurethane varnish is dried while heating the polyurethane varnish at a drying temperature that is higher than the varnish temperature during the varnish application step. This method has the disadvantage that a complex apparatus, comprising a rotating device, is required for forming the protective layer on the electrical coils.

SUMMARY

A cable exit cover for sealing a portion of a cable includes a first cover member and a second cover member matable with the first cover member to define a housing having an inlet receiving the cable. The inlet has a sealing seat accommodating the cable. The sealing seat has a plurality of gripping devices uniformly distributing a dispensed sealing material along the sealing seat to seal a gap between the sealing seat and the cable.

BRIEF DESCRIPTION OF THE DRAWINGS

The invention will now be described by way of example with reference to the accompanying Figures, of which.

DETAILED DESCRIPTION OF THE EMBODIMENTS

Figure 1:
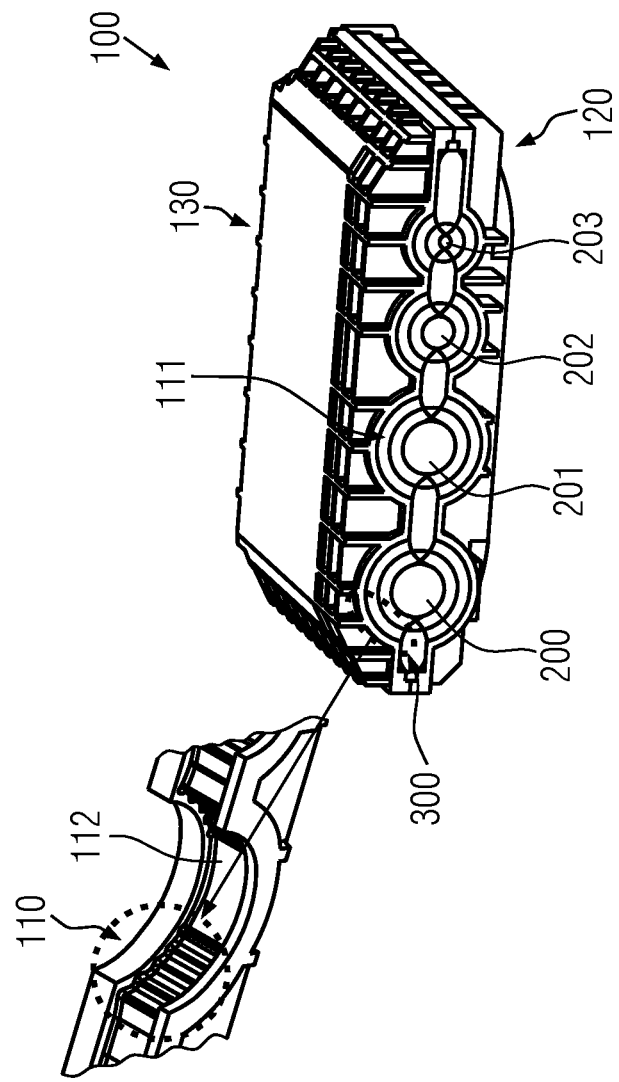
FIG. 1 is a perspective view of a cable exit cover according to an embodiment in a closed configuration.

In the following, the present invention is described with reference to particular embodiments as shown in the drawings. Nevertheless, the present invention is not limited to the particular embodiments described in the following detailed description and shown in the figures, but, instead, the embodiments described simply exemplify several aspects of the present invention, the scope of which is defined by the appended claims. Further modifications and variations of the present invention will be clear for the person skilled in the art. Therefore, the present description should be considered as including all the modifications and/or variations of the present invention, the scope of which is defined by the appended claims.

For simplicity, identical or corresponding components are indicated in the figures with the same reference numbers. For simplicity, the components according to the present invention are indicated with plain reference numbers, and the corresponding components according to prior art are indicated with primed reference numbers.

A cable exit cover 100 for sealing a portion of one of more cables 200, 201, 202, 203, which can be realized according to the present invention, is schematically illustrated in FIG. 1. The cable exit cover 100 of FIG. 1 accommodates four electrical cables 200, 201, 202, 203. However, any number of electrical cables may be accommodated in the cable exit cover 100 of the present invention, for instance one, two, three, five or more electrical cables.

The cable exit cover 100 comprises a first cover member 120 and a second cover member 130, configured to mate with the first cover member 120 to define four inlets 111 into which a portion of four corresponding cables 200, 201, 202, 203, can be inserted. The first cover member 120 and the second cover member 130 may alternatively be referred to as mating elements or mating parts. Each inlet 111, in the shown embodiment, has two sealing seats 112 for accommodating a portion of the corresponding cables 200, 201, 202, 203. A section of one of the two mating parts forming the sealing seat 112 is schematically illustrated in the enlarged view in FIG. 1. However, each inlet 111 according to the present invention may comprise any number of sealing seats 112, for instance one, three, four or more sealing seats.

The gap between the sealing seat 112 and the corresponding cable 200, 201, 202, 203 is filled with a dispensed sealing material 300. As can be seen in detail in the enlarged view of FIG. 1, the inner surface of the sealing seat 112 is provided with gripping devices 110, which are configured so as to provide a uniform distribution of the dispensed sealing material 300 upon application. As will be described in the more detail below, in fact, the dispensed sealing material 300 naturally tends to flow towards the bottom of each of the two mating parts forming the sealing seat 112, when it is applied, and to thin in the area of the sealing seat 112 proximate to the splitting line of the cable exit cover 100, where the first cover member 120 meets the second cover member 130. Without the gripping devices 110, the distribution of the dispensed sealing material 300 around the cable 200, 201, 202, 203 is not uniform and, in particular, the cable 200, 201, 202, 203 is not protected in the region close to the splitting line of the cable exit cover 100. The gripping devices 110 are configured so as to obstruct the flowing of the dispensed sealing material 300 along the inner walls of the sealing seat 112, because they are configured so as to protrude from the inner surface of the sealing seat 112 and to increase the inner surface travelled by the flowing dispensed sealing material 300. In an embodiment, the gripping devices 110 are uniformly distributed along the inner walls of each sealing seat 112.

The first cover member 120 and the second cover member 130 may be formed in polyamide, polyamide PA-GF30 or any other material having high resistance to high temperatures, for instance temperatures between −40° C. and 130° C. For example, polyurethane and silicone may be used as dispensed sealing materials 300.

Figure 2:
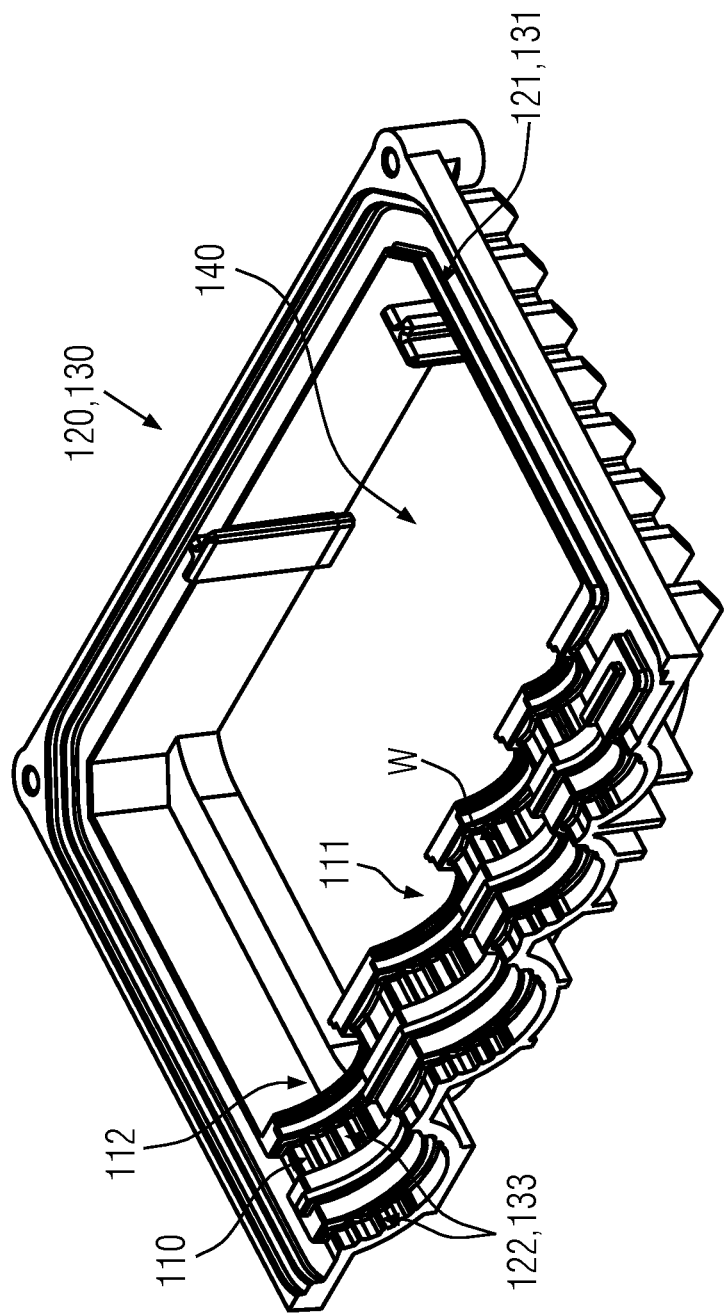
FIG. 2 is a perspective view of a cover member of the cable exit cover.

As shown in FIG. 2, each of the two cover members 120 and 130 is provided with a recess, respectively a first recess 122 and a second recess 133. When the two cover members 120, 130 are combined together, they form a closed housing 140 for accommodating electrical components and the two recesses 122 and 133 are mated to form four inlets 111, where corresponding cables can be inserted. In the present application, the word "housing" is used to indicate an inner portion of the cable exit cover 100, wherein the corresponding cable 200 can be accommodated. The portion of the housing where the cables are inserted is referred to as "inlet".

The part of each inlet 111 where the dispensed sealing material is applied forms a sealing seat 112. In FIG. 2, only a single cover member 120 or 130 is represented, therefore only half of each sealing seat 112 is visible. A complete sealing seat 112 is in fact formed when the first recess 122 of the first cover member 120 and the second recess 133 of the second cover member 130 are combined. Each sealing seat 112 has a circular section for accommodating a corresponding cable 200, 201, 202, 203 with a circular section. As will be detailed in the following, the inner surface of each sealing seat 112 is provided with gripping devices 110, configured to obstruct the flow of the dispensed sealing material 300 because of gravity.

In this application, when reference is made to the "circular section of each sealing seat", it has to be understood that each sealing seat 112 is configured as a ring, formed by the two mating recesses 122, 133 of the first cover member 120 and of the second cover member 130 for accommodating a portion of a cable 200 and of a dispensed sealing material 300. Therefore, the section of the inner surface of each sealing seat 112 is circular. The gripping devices 110 are formed on the curved, inner surface of each sealing seat 112 and they locally change the profile of the sealing seat 112 having a main circular section.

In the present application, the force of gravity defines a direction and that the top and bottom parts of the cable exit cover 100, the first cover member 120, and the second cover member 130 are defined in accordance with it; in particular, an object subjected to the gravity force will naturally flow from the top to the bottom part. Accordingly, the bottom of a recess 122, 133 and/or of the sealing seat 112 is defined as the portion of the inlet 111 and/or the sealing seat 112 where dispensed material naturally accumulates after flowing along the inner walls of the sealing seat 112 because of gravity.

As shown in FIG. 2, each sealing seat 112 has a substantially annular shape, having a circular section and having a width W smaller than the length of the portion of the cable that is inserted into the cable exit cover 100. In FIG. 2, two sealing seats 112 for each inlet 111 are illustrated. It is clear that, even if two sealing seats 112 for each inlet 111 are illustrated, any number of sealing seats 112 may be provided for each inlet 111 of the cable exit cover 110, according to the specific needs, for instance one, three, four or more sealing seats may be provided. If two or more sealing seats 112 are provided for accommodating the same cable 200, they are configured so as to be parallel to each other and to be placed one after the other along the insertion direction of each cable 200, so that a first portion of a cable 200 is accommodated on a first sealing seat 112 and a second portion of that cable 200 is accommodated on a second sealing seat 112.

Each of the first cover member 120 and the second cover member 130 is further provided with a groove 121 and 131, which extends along the entire perimeter of its inner surface. The inner surface of each cover member 120, 130 is the surface oriented towards the cable.

Figure 3:
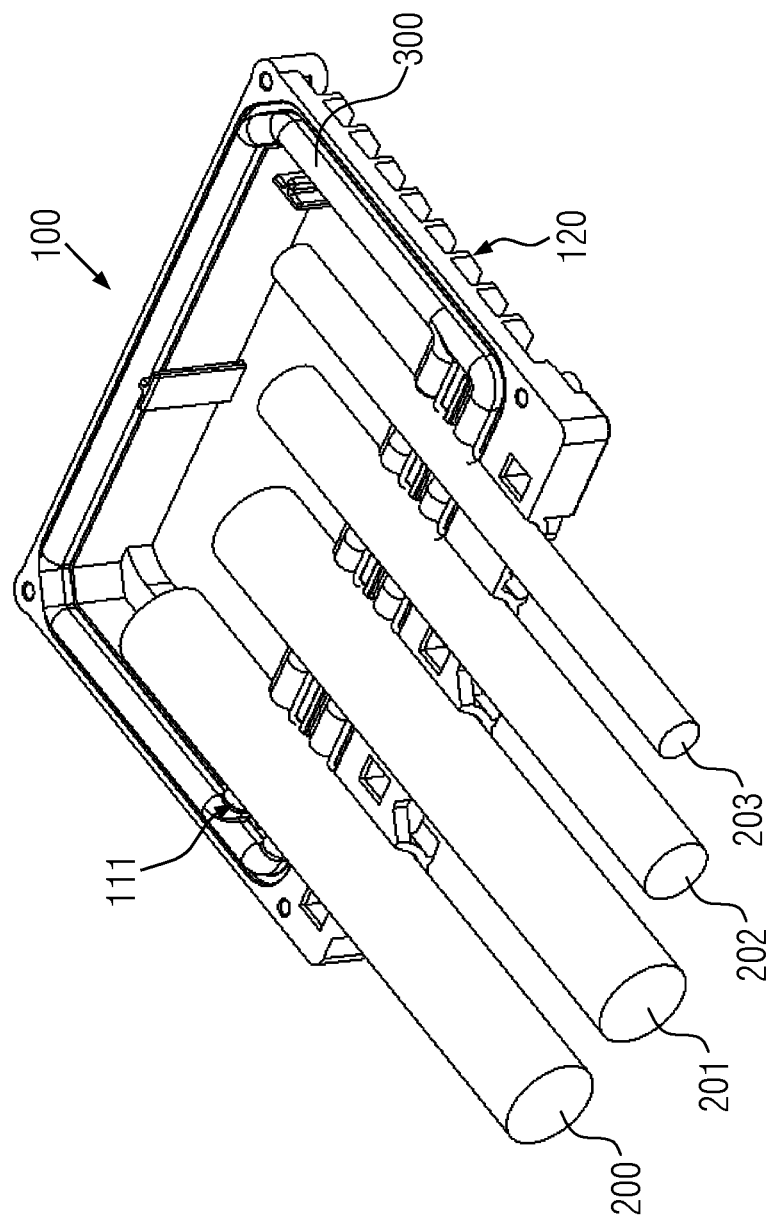
FIG. 3 is a perspective view of the cable exit cover in an open configuration with a dispensed sealing material.

As shown in FIG. 3, the recesses 122, 133 forming the two sealing seats 112 and the inner groove 121, 131 of the first and second cover member 120, 130 are filled with the dispensed sealing material 300; the sealing material 300 is applied in each cover member 120, 130 when it is disposed on a support surface. In this way, the entire inner surface of the one or more sealing seats 112 is sealed with the dispensed material 300 to provide a continuous sealing for the cables 200.

The cable exit cover 100 protects the inserted cables 200, 201, 202, 203 against the environment, not only in proximity of the inlet portion where the cable is inserted, but also on the lateral portions of the cable exit cover 100. After the dispensed sealing material 300 has been dispensed on the sealing parts, the electric cables 200, 201, 202, 203 are inserted and accommodated into the corresponding inlets 111. The cable exit cover 100 may be used, for instance, for covering a portion of electric wires used in high voltage applications. As is clear from FIG. 3, the dimensions of the cables 200, 201, 202, 203 do not need to be the same, but it is possible to use cables 200, 201, 202, 203 of different diameters within a certain tolerance range. For instance, cables 200, 201, 202, 203 having sections of 6 mm$^2$, 25 mm$^2$, 50 mm$^2$ or 95 mm$^2$, can be employed.

Figure 4:
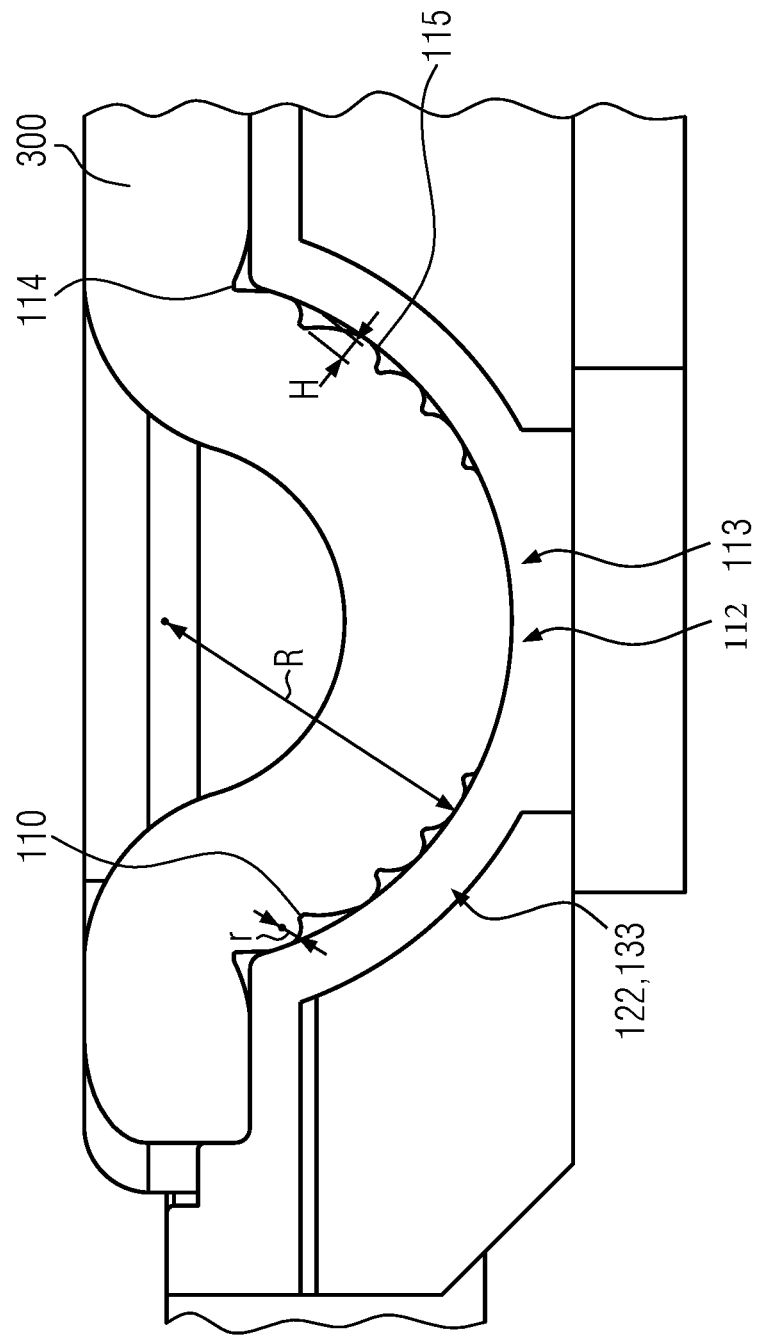
FIG. 4 is a detail sectional front view of a recess of a first cover member and a second cover member of the cable exit cover.

The gripping devices 110 according to the present invention are represented in detail in FIG. 4. Each sealing seat 112 has a circular section with a curvature radius R. The gripping devices 110 comprise protruding elements formed on the inner surface 115 of each sealing seat 112. The inner surface 115 of each sealing seat is the surface comprising all the points placed at a distance R from the center of the sealing seat 112; in other words, the inner surface 115 is the smooth surface of the sealing seat 112 not comprising the gripping devices 110. The gripping devices 110 prevent the accumulation of the dispensed sealing material 300 towards the bottom of each recess 122, 133 of the sealing seats 112, during application of the dispensed sealing material 300, because the edges 114 of the gripping devices 110 retain the dispensed sealing material 300 in the upper part of the recess 122, 133, after dispensing of the dispensed material 300.

The gripping devices 110 could be described as "steps" formed on the inner surface 115 of the sealing seat 112 and extending along the whole width of the sealing seat 112. Each sealing seat 112 has a predefined width for accommodating a portion of the corresponding cable 200 and the sealing material 300. The steps of the gripping devices 110 have an edge 114 which is placed at a height H with respect to the curved inner surface 115 of the sealing seat 112, as shown in FIG. 4. In an embodiment, the height H is constant or uniform along the whole width W. The two surfaces of each step converge at the edge 114 and form an acute angle, therefore the steps do not have an orthogonal section in the shown embodiment. The gripping devices 110 are formed on both the first recess 122 of the first cover member 120 and on the second recess 133 of the second cover member 130, so that the sealing seat 112 comprises gripping devices 110 symmetrically distributed around the cable 200, 201, 202, 203. However, the gripping devices 110 are not uniformly distributed on the sealing seat 112 and they are not present in the bottom part 113 of each recess 122, 133.

The gripping devices 110 may be configured so that each of the two surfaces converging at the edge 114 has a curvature radius r, shown in FIG. 4, which is smaller than the curvature radius R of the sealing seat 112. Therefore, the curvature of the inner surface 115 of the sealing seat 112 is locally reduced.

The gripping devices 110 increase the surface of the internal walls of each sealing seat 112 and increase the number of edges 114 on those internal walls. In this way, the flowing of the dispensed sealing material 300 is driven by the edged internal walls and the accumulation of the dispensed material 300 at the bottom of the recesses 122, 133 forming the sealing seat 112 is avoided. The dispensed sealing material 300, after injection, flows along the inner walls of each of the two mating parts 120, 130 forming the sealing seat 112 and flows along a longer route or trajectory with respect to the configuration of the sealing seat 112 without the gripping devices 110. In this way, the flowing of the dispensed sealing material 300 towards the bottom of each of the two mating parts 120, 130 of the sealing seat 112 is obstructed because of the increased friction that it experiences and the thinning of the dispensed sealing material 300 in critical areas proximate to the splitting line of the cable exit cover 100 is avoided. Moreover, the presence of the gripping devices 110 avoids formation of critical areas, that is the formation of areas close to the splitting portion between the two cover members 120, 130 where the dispensed sealing material 300 has thinned and hence gaps are formed in the seal.

Figure 6:
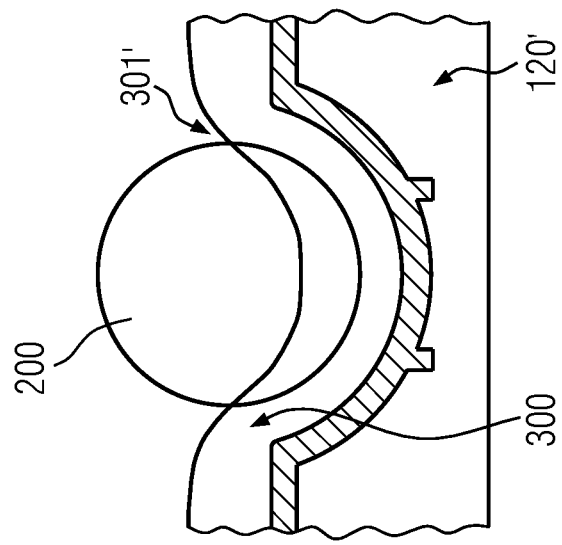
FIG. 6 is a detail sectional front view of a sealing member on a sealing seat according to the prior art.
Figure 5:
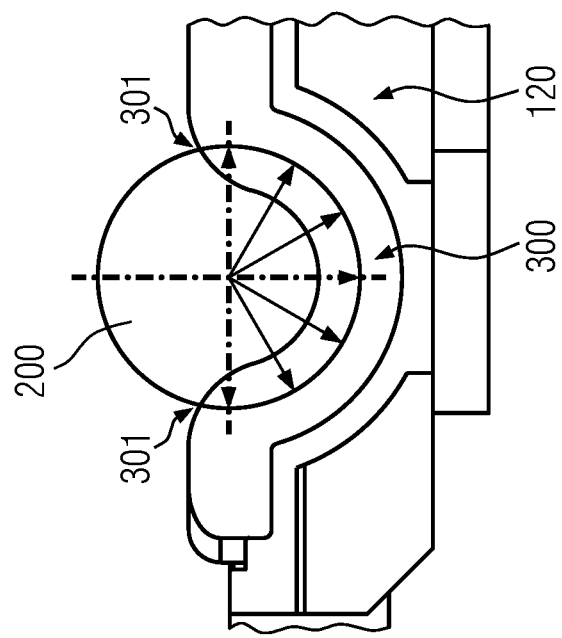
FIG. 5 is a detail sectional front view of pressure distribution of the sealing material of the cable exit cover on a cable.

The advantage of the present invention with respect to prior art will be apparent by comparing FIG. 5 and FIG. 6.

FIG. 5 represents a dispensed sealing material 300 provided around a cable 200, 201, 202, 203, according to the present invention. Because the gripping devices 110 inhibit the flowing of the dispensed material 300 towards the bottom of each recess 122, 133 of the sealing seat 112, when the two recesses 122, 133 are combined to form the sealing seat 112, the dispensed sealing material 300 is uniformly distributed along the inner walls of the sealing seat 112 and around the cable 200, 201, 202, 203. In this way, the radial reaction and the radial pressure of the gasket on the cable 200, 201, 202, 203 is symmetrical and sealing is assured along the whole perimeter of the circular section of the cable 200, 201, 202, 203. In particular, the radial thickness of the dispensed sealing material 300 on the portions of the sealing seat 112 proximate to the splitting line of the cable exit cover 100 is equal to the radial thickness of the dispensed sealing material 300 at the top and at the bottom of the sealing seat 112.

The dispensed sealing material 300 is applied on each sealing seat 112 and is not distributed along the entire length of the cable 200, which is inserted into the cable exit cover 100. In this way, the amount of dispensed sealing material 300 used to provide the sealing is reduced, thus also reducing the production costs. However, a secure and reliable sealing against water and dust is assured.

To the contrary, according to prior art, as shown in FIG. 6, the first cover member 120' and the second cover member 130' are not provided with gripping devices 110 and the dispensed sealing material 300 tends to thin down at the corners of the recesses 122', 133' and to thicken at the bottom of the recesses 122', 133' of the sealing seat 112'. Therefore, in prior art configurations, the radial thickness of the dispensed sealing material 300 in the area 301' proximate to the splitting line of the cable exit cover 100 is smaller than the radial thickness of the dispensed sealing material 300 in the bottom portion and in the top portion of the sealing seat 112' (which correspond, respectively, to the bottom portions of the first recess 122' and of the second recess 133'). In this way, the dispensed sealing material 300 is not well distributed and the radial reaction of the gasket is not symmetrical around the cable 200, 201, 202, 203.

The presence of the gripping devices 100 of the present invention is crucial for assuring a uniform radial distribution of the dispensed sealing material 300 around the cable 200, 201, 202, 203. In fact, the dispensed sealing material 300 is first applied on both covers 120 and 130 and later the two covers 120 and 130 are mated together, to ensure the sealing of the system. If each cover member 120, 130 does not have a uniform distribution of the dispensing sealing material 300, when the two covers are mated with each other, the regions 301 around the cable do not contain a sufficient amount of dispensing sealing material 300, therefore, gaps in the sealing are formed.

Figure 7:
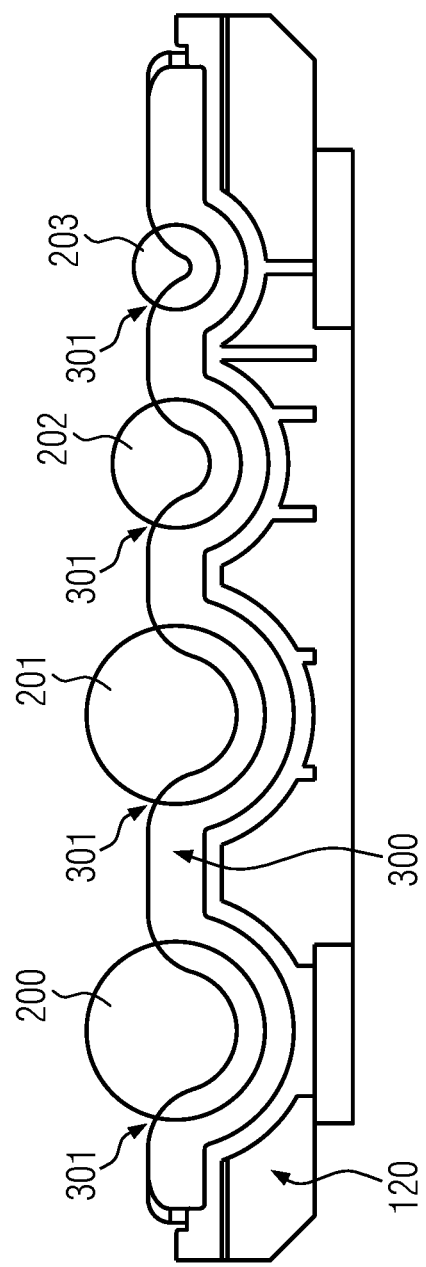
FIG. 7 is a sectional front view of a first cover member of the cable exit cover accommodating four cables having different diameters.

FIG. 7 schematically shows that the cable exit cover 100, according to the present invention, may be used for cables 200, 201, 202, 203 of different dimensions and diameters, while still providing an efficient and reliable sealing. The first cover member 120, represented in FIG. 7, is characterized by recesses 122 having different curvature radii. Each sealing seat 112 is provided with gripping devices 110 for assuring a uniform distribution of the dispensed sealing material 300. The dimensions, for example height H, width W and local curvature radius r, of the gripping devices 100 are adapted to the dimensions of the corresponding cable 200, 201, 202, 203 and accordingly of the corresponding sealing seat 112. In this way, the portion 301 in correspondence to the splitting line on the cable exit cover 100 has a thickness of the dispensed sealing material 300, which is equal to the thickness of the dispensed sealing material 300 at the bottom of each recess 122, for all the cables dimensions.

The dispensation of the sealing material 300 is carried out always in the same way, regardless of the dimensions of the cables accommodated into the cable exit cover 100. In an embodiment, the dispensed seal 300 has a width of 6 mm and a height of 6.5 mm. In other embodiments, the dimensions of the dispensed seal 300 may vary according to the needs of the product.

The present invention also refers to a method for assembling a cable exit cover 100 for sealing a portion of one or more cables 200 against the entrance of water and/or dust.

The method comprises providing a first cover member 120 having a first recess 122 and a first groove 121 and a symmetrical second cover member 130 having a second recess 133 and a second groove 131, like the ones represented in FIG. 2. The recesses 122, 133 of the first cover member 120 and of the second cover member 130 may be provided with gripping devices 110, in order to assure a uniform distribution of the dispensed sealing material 300 on the sealing seat 112 formed by the two mating recesses.

Figure 8:
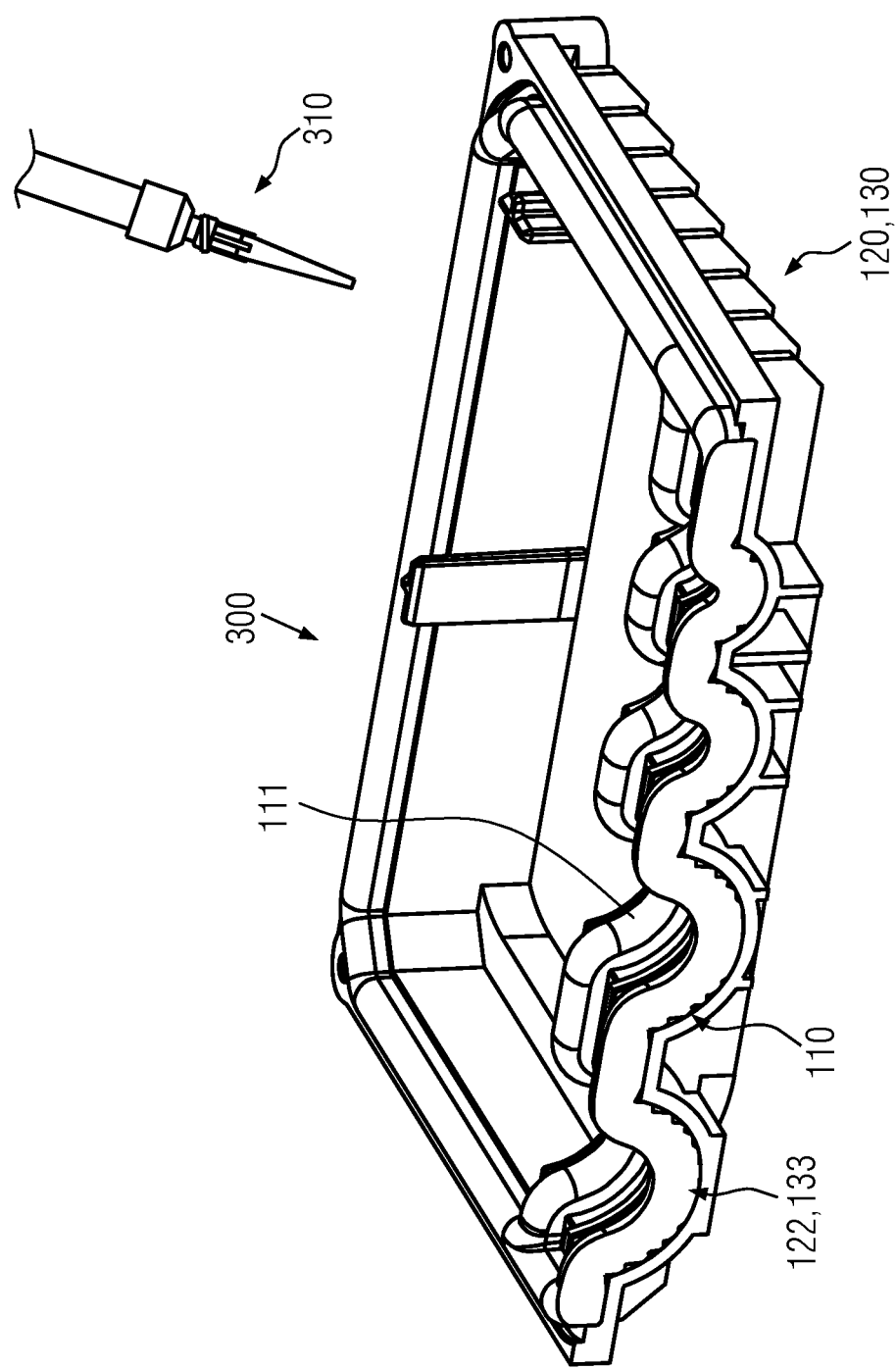
FIG. 8 is a perspective view of a cover member of the cable exit cover during application of the dispensed sealing material by a robotic application device.

The dispensed sealing material 300 is dispensed on both recesses 122 and 133 and grooves 121 and 131, respectively, of the first cover member 120 and on the second cover member 130. In an embodiment, these operations are carried out simultaneously. In an embodiment, these operations are carried out by using robotic application device 310, for instance a nozzle, for dispensing the dispensed sealing material 300, as schematically illustrated in FIG. 8. The robotic application device 310 may operate at a constant speed along the grooves 121, 131. The speed may be reduced or increased according to the application.

During application of the dispensed material, the first cover member 120 and the second cover member 130 are placed on a support surface and they are oriented so that their inner surface comprising the groove 121, 131 is oriented towards the robotic application device 310. In this way, not only the part of the cable exit cover 100 where the cables 200 are inserted is sealed and protected, but also the other lateral parts of the cable exit cover 100 are protected and sealed against the external environment.

After filling the grooves 121 and 131 and the recesses 122 and 133, the cables 200, 201, 202, 203 are inserted into the corresponding inlets 111 and sealing seats 112 of the first cover member 120. The first cover member 120 and the second member 130 are symmetrical and the cables 200, 201, 202, 203 may be inserted also in the corresponding seats of the second cover member 130.

The second cover member 130 is then combined with the first cover member 120 in order to accommodate and cover or encapsulate a portion of the cable 200, 201, 202, 203. For example, the first cover member 120 and the second cover member 130 may be fixed to each other by using screws. In this way, a cable exit cover 100 providing a reliable sealing for the cables 200, 201, 202, 203 is obtained.

In another embodiment, the cable exit cover 100 is used for a cable exit configuration set at 90°. This configuration has the advantage that a stable and reliable sealing is provided for cable exit configurations wherein the cables 200 are placed and connected at 90°. Moreover, this configuration allows to automatize, to simplify and to speed up the assembly process of the cable exit cover 100. The cable exit configuration set at 90° indicates a configuration wherein one end of one or more cables 200 is crimped to a corresponding terminal, is inserted inside the housing 140 of the cable exit cover 100 along a first direction perpendicular to the surface of the first cover 120, before assembly of the cover, and is then bent at 90° so that the cable is placed inside a first recess of the first cover 120. It is clear that a cable exit configuration set at 90°, wherein the crimped end of the cable 200 is initially placed inside a second recess of the second cover 130 is also possible.

The cable exit cover 100 is provided with a simple and reliable sealing system and the assembly is realized with a reduced number of components, thus guaranteeing the possibility of an easy automated process.

While the invention has been described with respect to physical embodiments constructed in accordance therewith, it will be apparent to those skilled in the art that various modifications, variations and improvements of the present invention may be made in light of the above teachings and within the purview of the appended claims without departing from the spirit and intended scope of the invention. For instance, it is clear that, even if the method of dispensing the dispensed sealing material 300 in a uniform way along the inner walls of the sealing seat 112 has been described in reference to the cable exit cover 100, the same method could be used for any other device where a viscous material needs to be dispensed. For instance, the gripping devices 110 according to the present invention may be provided on the inner surface of the moldings for forming multi-layer cables provided with insulating and protecting layers.

In addition, those areas in which it is believed that those of ordinary skill in the art are familiar, have not been described herein in order not to unnecessarily obscure the invention described. Accordingly, it has to be understood that the invention is not to be limited by the specific illustrated embodiments, but only by the scope of the appended claims.

What is claimed is:

1. A cable exit cover for sealing a portion of a cable, comprising:
   a first cover member; and
   a second cover member matable with the first cover member to define a housing having an inlet receiving the cable, the inlet has a sealing seat accommodating the cable, the sealing seat has a plurality of gripping devices uniformly distributing a dispensed sealing material along the sealing seat to seal a gap between the sealing seat and the cable, the gripping devices are a plurality of protruding elements that are formed directly on an inner surface of the sealing seat, protrude from the inner surface of the sealing seat, and are separated from one another along the inner surface of the sealing seat, the inner surface of the sealing seat has a curvature radius between the protruding elements and the protruding elements have a reduced curvature radius that is less than the curvature radius.

2. The cable exit cover of claim 1, wherein the elements increase a surface of a plurality of inner walls of the sealing seat along which the dispensed sealing material flows.

3. The cable exit cover of claim 2, wherein each of the protruding elements has an edge, the dispensed sealing material flowing along the inner walls encounters a plurality of edges.

4. The cable exit cover of claim 2, wherein the protruding elements extend along a whole width of the sealing seat.

5. The cable exit cover of claim 2, wherein the gripping devices have a uniform height with respect to the inner walls of the sealing seat.

6. The cable exit cover of claim 1, wherein the gripping devices are symmetrically formed directly on the inner surface of the sealing seat.

7. The cable exit cover of claim 1, wherein the sealing seat has an annular shape.

8. The cable exit cover of claim 7, wherein the annular shape has a width smaller than a length of the portion of the cable inserted into the cable exit cover.

9. The cable exit cover of claim 1, wherein the housing has a plurality of inlets receiving a plurality of cables, each of the inlets has a curvature radius matching a radius of one of the cables.

10. The cable exit cover of claim 1, wherein the inlet is formed by a pair of sealing seats to accommodate the cable.

11. The cable exit cover of claim 1, wherein the first cover member has a first groove extending along a perimeter of an inner surface of the first cover member and/or the second cover member has a second groove extending along a perimeter of an inner surface of the second cover member.

12. The cable exit cover of claim 11, wherein the first groove and/or the second groove is filled with the dispensed sealing material.

13. The cable exit cover of claim 11, wherein the sealing seat is positioned along the first groove and/or the second groove adjacent to the inlet.

14. The cable exit cover of claim 1, wherein the cable exit cover is used for a 90° cable exit configuration.

15. The cable exit cover of claim 1, wherein the protruding elements extend along a direction in which the cable extends through the inlet.

16. The cable exit cover of claim 6, wherein the gripping devices are not uniformly formed directly on the inner surface of the sealing seat and are not present in a bottom part of the sealing seat.

17. The cable exit cover of claim 16, wherein the inner surface of the sealing seat has the curvature radius in the bottom part of the sealing seat.

18. The cable exit cover of claim 1, wherein the gripping devices form a plurality of steps along the inner surface of the sealing seat.

19. The cable exit cover of claim 1, wherein the gripping devices locally change a profile of the sealing seat.

* * * * *